April 22, 1958 — H. M. STUELAND — 2,831,466
FLUID PRESSURE SYSTEM WITH RECIRCULATING CIRCUIT
Filed March 28, 1955 — 2 Sheets-Sheet 1
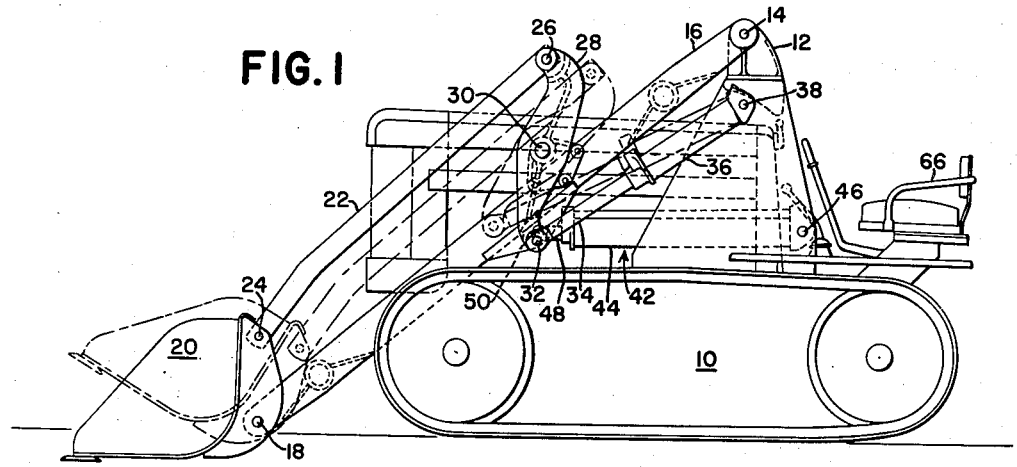
FIG. I
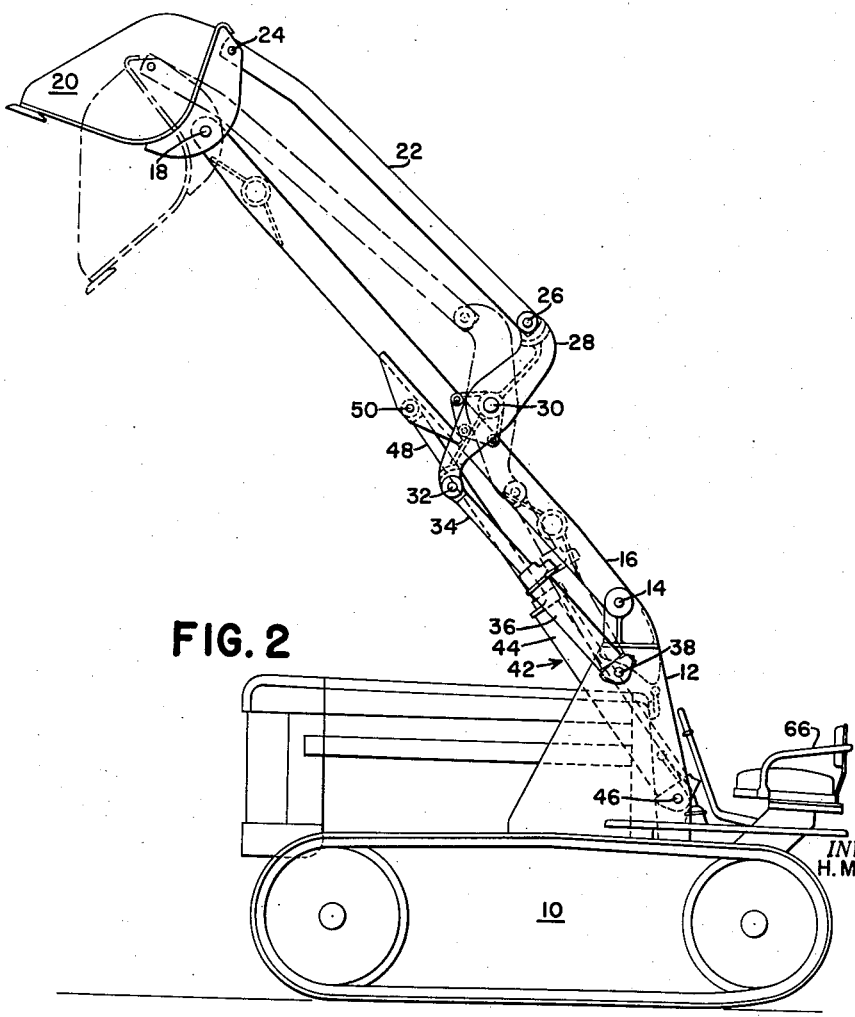
FIG. 2
INVENTOR.
H. M. STUELAND April 22, 1958  H. M. STUELAND  2,831,466
FLUID PRESSURE SYSTEM WITH RECIRCULATING CIRCUIT
Filed March 28, 1955  2 Sheets-Sheet 2

INVENTOR.
H. M. STUELAND

# United States Patent Office 2,831,466
Patented Apr. 22, 1958

2,831,466

FLUID PRESSURE SYSTEM WITH RECIRCULATING CIRCUIT

Harold M. Stueland, East Moline, Ill., assignor to Deere & Company, Moline, Ill., a corporation of Illinois Application March 28, 1955, Serial No. 497,079

4 Claims. (Cl. 121—46.5)

This invention relates to a fluid-pressure system and more particularly to such system for use in power-operating a load-handling machine having a load-carrying member selectively movable between a lowered position and a raised position.

A typical example of such machine is an earth-handling machine having a bucket operative in a lowered position to collect a load and operative in a raised position to dump the load into a waiting vehicle, for example. Fluid-pressure systems are admirably adapted for the control of mechanisms of this character, because of their inherent flexibility, power capacity and ease of control. Most of these systems will use one or more double-acting motors of the cylinder and piston type to effect raising and lowering of the bucket between digging and dumping positions. Because of the relatively great weight of the components involved, it will be appreciated that gravitational lowering of the bucket from its dumping position to its digging position causes exhaust of fluid to the reservoir at a substantially high rate, resulting in frothing of the fluid, rupture of the fluid lines and the reservoir walls and violent expulsion of fluid through the reservoir filler neck. These problems have not gone without recognition and the attempted solutions are legion.

The simplest and most expedient solution utilizes the interchange of fluid from one end of the cylinder to the other, particularly on lowering of the bucket; that is to say, one end of the cylinder functions as a reservoir for fluid exhausted from the other end of the cylinder. Because of the relatively high strength of the motor, rupture of parts is unlikely. Moreover, the relatively short distance between opposite ends of the motor eliminates frothing of the fluid. However, there remain minor problems to be overcome, among which are the elimination of resistances in the lines and the possibility of abnormal reduction in pressure in the reservoid end of the motor. Undue restriction in the lines interfere with rapid lowering and extreme reductions in pressure cause the moving piston to pull a vacuum on a portion of the circuit. Solutions to these problems are complicated somewhat by the requirement that the fluid-interchange circuit between opposite ends of the motor must necessarily pass through the control valve, therefore requiring a control valve of adequate design to include all phases of operation of the system.

According to the present invention, these problems are eliminated by the provision of a novel control valve having, in addition to neutral and operating positions, an additional position controlling the recirculating circuit. The control features means for pressurizing the recirculating circuit so as to insure filling of the reservoir end of the motor by fluid, thus eliminating the possibility of drawing in air or vapor. The improvement is fundamentally adapted for use with a system in which raising of the bucket or other load is accomplished by supplying fluid under pressure to the end of the piston having the larger area, in a case in which the motor is of the cylinder and piston type wherein the piston rod extending through one end of the cylinder and connected to the proximate side of the piston reduces the volume of one end of the cylinder and correspondingly reduces the area of that side of the piston. In a situation of this type, there will be a volumetric excess of fluid from the large-area side of the piston. According to this invention, the volumertric excess is diverted not directly to the reservoir but to a return line in which the pressure is that of the idling pump. Therefore, the invention features a diversion or relief passage cross-connecting the recirculating circuit with the discharge side of the pump, which is connected to the return passage, the diversion or relief passage including means therein operative to open that passage only when the small-volume or reservoir end of the cylinder is filled with fluid, thereby avoiding the sucking in of air.

Still another object of the invention is to provide an improved control valve having four positions, one of which is a neutral position, another of which is a raised position, another of which is a down-pressure position so that down pressure may be applied to the bucket in its digging position, and the fourth of which positions is a combination drop-float position in which the speed of drop is relatively accelerated. It is in the fourth position that the recirculating circuit is of greatest importance, because this position has a dual function; i. e., it not only permits rapid descent of the load but serves as a "float" position when the load is ground-supported. Of further importance is the sequence of the positions, wherein the drop-float position is placed immediately next to the neutral position, which is significant for many reasons, among which are the frequency of use of the drop-float position and the desirability of achieving that position without passing through some other position that connects the cylinder to the pump. Because of the isolation of the pressurizing or recirculating circuit, the improved valve is admirably adapted for use in multiple valve systems, regardless of the nature of such other valves and irrespective of whether the system is series or parallel.

The foregoing and other important objects and desirable features inherent in and encompassed by the invention will become apparent from the following detailed description of a preferred embodiment of the invention as illustrated in the accompanying sheets of drawings, the several figures of which will be described immediately below.

Fig. 1 is a side elevational view of a tractor-mounted loader including fluid motors controlled by the system forming the subject matter of the present invention, the bucket or load being shown in its lowered or digging position in full lines and in tilted position in broken lines.

Fig. 2 is a side elevational view of the structure of Fig. 1, the bucket being shown in full lines in its raised position and in broken lines in its dumping position.

Figure 3:
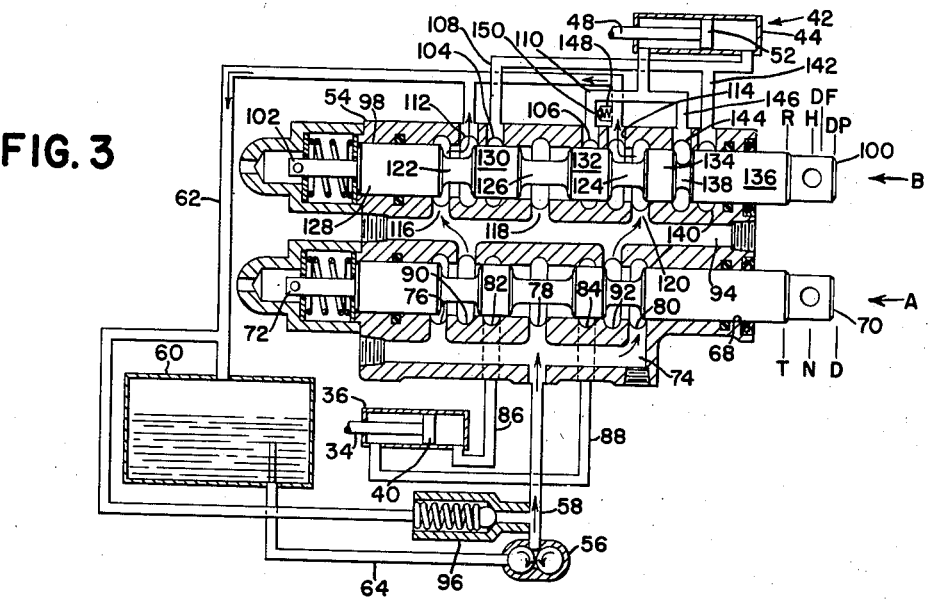
Fig. 3 is a schematic view, partly in section, showing the control valves used in raising and lowering the bucket and in controlling the tilt and dump of the bucket, both valves being shown in their respective neutral positions.

In Figs. 1 and 2, the invention is illustrated in conjunction with a tractor-mounted loader in which the tractor has a main body 10 including supporting structure 12 at the upper end of which is a pivot 14 on a transverse horizontal axis for mounting the upper end of a lift arm or boom 16. It will be understood that in a conventional structure there are two arms such as the arm 16 but the illustration of one in the present instance will suffice.

The boom 16 extends ahead of the tractor and has at its forward end a transverse pivot at 18 which effects the pivotal mounting of a tiltable and dumpable load-carrying bucket 20. The position of the bucket 20 relative to the boom 16 is controlled by a bucket-control link 22 having its front end pivotally connected at 24 to the bucket above the pivot 18 and having its rear end pivotally connected at 26 to the upper end of a lever 28. This lever is pivotally mounted at 30 intermediate its ends to an intermediate portion of the boom 16, the lower end of the lever depending below the pivot 30 to provide a pivotal connection at 32 with a piston rod 34 that is carried in and combines with a cylinder 36 to afford a bucket-control motor 34—36. The cylinder is pivotally connected at 38 to the supporting structure 12 just below the boom pivot 14. The piston rod 34 is connected to a piston 50 (Fig. 3) internally of the cylinder 36.

A boom-control motor, designated generally by the numeral 42, includes a cylinder 44, pivotally connected at 46 to a lower portion of the supporting structure 12, and a piston rod 48, pivotally connected at 50 to an intermediate portion of the boom 16. The piston rod 48 extends through one end of the cylinder 44 and is connected to one side of a piston 52 (Figs. 3 through 6).

Raising and lowering of the boom 16 and bucket 20 connected thereto are controlled by a control valve, designated generally by the letter B. Tilting and dumping of the bucket 20 is controlled by a control valve, designated generally by the letter A. As shown in Fig. 3, the control valves A and B may be suitably incorporated in a single valve casing 54. The valves B and A are arranged in series or sequence in the casing 54 and one side of the casing is connected to the discharge side of a pump 56 by a high-pressure line 58. The other side of the casing 54 is connected to a reservoir 60 by a reservoir or return line 62. The low or suction side of the pump 56 is connected to the reservoir by an intake line 64.

The control assembly is mounted in any convenient location on the tractor and is suitably controlled by the operator thereon from an operator's station 66. These details are immaterial here and have therefore not been elaborately disclosed.

The lower portion of the valve casing 54 includes a valve bore 68 which carries a shiftable valve member 70. The valve member 70 for the control valve A is centered in a neutral position by any suitable centering means such as designated by the numeral 72. A manifold pump passage 74 is connected to the high-pressure line 58 and has three branch passages in the form of annular grooves 76, 78 and 80 spaced apart axially along the bore 68 and in communication therewith. Motor passages 82 and 84 in the form of annular grooves offset axially respectively to opposite sides of the central pump passage groove 78 lead from the bore 68 respectively via motor lines 86 and 88 to opposite ends of the bucket-control cylinder 36. Additional annular grooves 90 and 92 provide passages communicating the bore 68 of the valve A with an intermediate manifold passage 94 that serves as a return passage for the valve A and as a pump passage for the valve B, the valves A and B, as previously noted, being in series in that order.

Ignoring for the moment the valve B and assuming that the passage 94 is permanently connected directly to the return line 62, it will be seen that the motor passages 82 and 84 of the valve A are selectively connectible respectively to the discharge side of the pump and to the return passages afforded by the annular grooves 90 and 92. For example, if the bucket is in the full-line position shown in Fig. 1 and it is desired to tilt it rearwardly about its pivot to the broken-line position in Fig. 1, the valve member 70 is shifted to the left from the neutral position of Fig. 3 to the "tilt" position, designated by the letter T. The valve member 70 is of the conventional spool type and has alternate lands and grooves for controlling the various passages so that when the valve member is shifted to the tilt position, the pump passage 78 is connected to the motor passage 82 and fluid is supplied via the motor line 86 to the right-hand end of the bucket-control cylinder 36, the piston 40 moving to the left and causing clockwise angular movement of the bucket-control lever 28 about its pivot 30 on the boom 16. The upper end of the lever 28 pulls rearwardly on the bucket-control link and tilts the bucket as shown in broken lines in Fig. 1. Simultaneously with the connection of the passages 78 and 82 by shifting of the valve member 70 of the valve A to its tilt position, the motor passage 84 is connected to the return passage 92, and fluid exhausted from the left-hand side of the piston 40 is transmitted via the motor line 88 to the manifold passage 94 and thence via the line 62 to the reservoir.

The bucket 20 may be returned to its full-line position of Fig. 1 or may be dumped from its full-line position of Fig. 2 to its broken-line position of Fig. 2 by shifting of the valve member 70 of the valve A to the "dump" position, designated by the letter D in Fig. 3. In this case, the connections of the motor and return passages are reversed and fluid under pressure is supplied to the left-hand end of the piston 40. The arrangement is such that the greatest power is obtainable in tilting of the bucket, which enables the tilting function to be utilized in digging so that maximum power is available to break material loose from a pile or the like.

A relief valve 96, hereinafter referred to as the main relief valve, interconnects the high-pressure line 58 and the reservoir 60. The relief valve is appropriately set to open at a selected predetermined value, such as 1200 p. s. i.

The control valve B comprises the upper portion of the valve casing 54, in which is formed an axial bore 98. A valve-control member 100 is axially slidable in the bore 98 and is centered in a neutral position, as shown in Fig. 3, by suitable centering means such as designated by the numeral 102. The bore 98 is in communication with axially spaced bore-encircling grooves providing first and second motor passages 104 and 106. The passage 104 is connected by a motor line 108 to the right-hand end of the cylinder 44 of the lift motor 42. A second motor line 110 connects the second motor passage 106 to the left-hand end of the cylinder 44. Because of the extension of the piston rod 48 through the left-hand end of the cylinder 44, the left-hand side of the piston 52 is of smaller area than the right-hand side. Stated otherwise, the volumetric capacity of the left-hand end of the cylinder is reduced below that of the right-hand end of the cylinder. The motor 42, including the cylinder 44 and piston rod 48, is connected between the tractor-mounted supporting structure 12 and the boom 16 in such manner that the large-area side of the piston 52 is utilized to raise the boom and bucket, thus affording maximum power for lifting.

The motor passages 104 and 106 are respectively paired with return grooves or passages 112 and 114, these return passages leading in common, as shown, to the return line 62. Branches 116, 118 and 120 lead from the manifold passage 94, which passage for present purposes will be considered as a pump passage. When the control valve member 100 of the lift control valve B is in its neutral position, as shown in Fig. 3, pump pressure is conveyed from the passage 94 to the line 62 via or across the valve bore 98 by reason of reduced intermediate portions 122 and 124 of the valve member 100, the reduced portion 122 serving to interconnect the passages 116 and 112 and the reduced portions 124 serving to interconnect the passages 120 and 114.

The valve member 100 is of the spool type, having in addition to the reduced portions 122 and 124 a central reduced portion 126; and the reduced portions are interspaced with lands 128, 130, 132 and 134. The right-hand end portion of the valve member 100 forms an additional land 136 that is separated from the land 134 by a reduced portion 138.

As previously outlined, it is a feature of the invention to provide a recirculating line or circuit affording the interchange of fluid between opposite ends of the cylinder 44. For this purpose, the recirculating line includes a first recirculating passage in the form of an annular internal groove 140 opening to the valve bore 98 and normally encircling the right-hand endmost land 136. The passage 140 is connected by a line 142 to the motor line 108, thus establishing in effect a connection with the first motor passage 104. Stated otherwise, both lines 108 and 142 are connected simultaneously to the large-volume or right-hand end of the cylinder 44. The recirculating line includes a second passage portion in the form of a second annular groove 144 opening to the bore 98 and normally encircling the reduced valve portion 138 (Fig. 3). This passage portion is connected by a line 146 to the motor line 110, constituting in effect a connection to the second motor passage 106.

A diversion or relief line, controlled by a biased or spring-loaded check or relief valve 150, cross-connects the recirculating line 108—142—140—144—146—110 and the return passage 114, it being noted that portions of the lines 108 and 142 are in common and that portions of the lines 110 and 146 are in common.

When both valves B and A are in neutral, the pump circulates fluid at pump pressure to the reservoir via the related pump and return passages as indicated. The endmost land 136 on the control valve member 100 for the control valve B blocks or disconnects the recirculating line because of its blockade position relative to the recirculating passage portion 140. The lands 130 and 132 of valve B respectively block the motor passages 104 and 106, thus establishing a hydraulic lock on the lift motor 42. Lands, as indicated, on the valve member 70 for the control valve A block the motor passages 82 and 84 and thus hydraulically lock the bucket-control motor 34—36.

The selective operation of the valves B and A is as follows, assuming that the parts are as shown in full lines in Fig. 1. If the operator desires merely to tilt the bucket 20 rearwardly about its pivot 18, he operates the valve A by shifting the control valve member 70 to the left to the position T, which gives the result previously described. Fluid exhausted from the small-volume end of the cylinder 36 is returned to the return line 62 via the line 88 and passages 84—92, 94, and 120—124—114. If, while the piston 40 in the bucket-control cylinder 36 is moving to the left, the operator controls the valve B by shifting the valve member 100 in either direction from its "hold" or neutral position, as designated by the letter H in Figs. 3–6, instantaneous power of short duration may be obtained because of the differential between the right- and left-hand sides of the piston 40. Although this is an important phase of operation of the circuit, the primary benefits are obtained from the recirculating circuit as used in conjunction with normal operation of the control valve B independently of the control valve A, which operation will be described immediately below.

For the purposes of this phase of the description, it will be assumed that valve A is always in its neutral position. Therefore, the manifold passage 94 may be considered as a high-pressure or pump passage delivering to the bore 98 of the valve B via the pump passage branches 116, 118 and 120.

With valve B in its hold or neutral position, as designated by the letter H in Fig. 3, the pump 56 circulates fluid to the reservoir 60 at no appreciable pressure. Fluid from the passage 94 flows to the return line via 116—122—112 and via 120—124—114.

Figure 6:
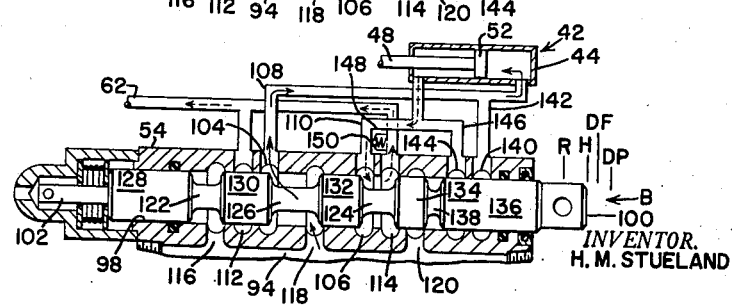
Fig. 6 is a similar view with the valve in its raised position.

The raise position of valve B is illustrated in Fig. 6, the letter R being used to indicate the change in position of the valve member 100 as respects the positions of that member in the other figures. In this setting of valve B, fluid under pressure from the passage 94 is blocked at 116 and 120 by the valve lands 130 and 134 respectively. Hence, fluid enters the passage 118 and crosses the valve bore 98 because of the reduced valve portion 126, flowing thence through the first motor passage 104 and first motor line 108 to the large-volume end of the cylinder 44. As the piston 52 and piston rod 48 are forced to the left, the boom 16 and bucket 20 connected thereto are raised. At any time in the raising range, the operator may return the valve member 100 to neutral so as to hold or retain the adjusted position of the boom and bucket.

As the piston 52 in the lift motor 42 moves to the left, fluid exhausted from the small-volume end of the chamber is returned to the reservoir via the second motor line 110, second motor passage 106 and second return passage 114, the reduced portion 124 of the valve member 100 serving to connect the motor passage 106 and the return passage 114. As already noted, the passages 116 and 120 are blocked respectively by the valve lands 130 and 134. In addition, the land 130 blocks the other return passage 112 and the right-hand endmost land 136 blocks both recirculating passages 140 and 144. Hence, although the recirculating line portion 146 is connected as a branch to the motor line 110, returning fluid must follow the path via 106—124—114. Stated otherwise, in the raise position, the fluid exhausted from the small-volume end of the lift cylinder 44 is not transferred to the large-volume end of the cylinder. Such exhaust fluid returns to the reservoir at substantially no pressure and therefore has no effect on the diversion or relief valve means 148—150.

In Fig. 6, the path of fluid under pressure is shown by full-line arrows and the path of the exhaust fluid is shown by dotted arrows.

When the bucket has attained the height desired, it may be dumped by operation of valve A in the manner previously described.

Figure 4:
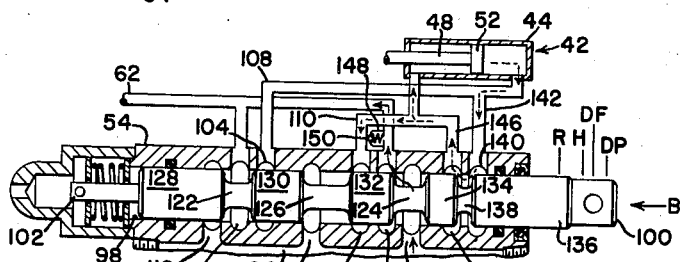
Fig. 4 is a fragmentary sectional and schematic view showing the control valve for raising and lowering the bucket, the valve member being shifted to its lowering position.

Lowering of the bucket and boom by valve B is effected by setting the valve in its drop-float position, as indicated by the letters DF, which, in Fig. 4, designates the position of the valve member 100.

In the Fig. 4 or drop-float position of the valve member 100, all of the pump passages with the exception of passage 120 are blocked. The passage 120 is communicated via the reduced valve portion 126 with the return passage 114 which is in permanent communication with the return line 62. The valve lands 130 and 132 block the motor passages 104 and 106. The recirculating passage portions 140 and 144 are communicated via the reduced valve portion 138. As the bucket and boom lower, the weight thereof forces the piston 52 to the right, discharging fluid from the large-volume end of the cylinder, which fluid follows the path shown in dotted lines. The path of the circulating pump pressure to the reservoir is shown in full lines. It will thus be seen that the fluid exhausted from the large-volume end of the cylinder 44 follows the recirculating line 140 and enters the recirculating passage 140, flowing thence via the reduced valve portion 138 to the other recirculating passage 144 and thence via the line 146 to the line 110. Since the line 108 is blocked at the motor passage 104 by the valve land 130 and since the line 110 is blocked at the motor passage 106 by the valve land 132, fluid flow must be from the large-volume end of the cylinder to the small-volume end of the cylinder. In order that this flow may be pressurized to the extent that filling of the small-volume end is ensured, thus guarding against the sucking in of air at the small-volume end, the diversion or auxiliary relief valve means 148 and 150 is set at a predetermined value lower than the setting of the main relief valve 96. Accordingly, the relief valve 148—150 does not open until filling of the small-volume end is accomplished. Because of the larger area at the right-hand side of the piston 52, there will be a volumetric excess of fluid which cannot, of course, be accommodated by the small-volume end of the cylinder. This volumetric excess is diverted to the return line 60 when the relief valve 150 opens. The setting of this valve is, as already stated, much lower than that of the main relief valve 96. Experience has shown that a setting of between 200 to 800 p. s. i. will give satisfactory results; although, variations in spring and passage sizes will give beneficial results in other circumstances.

Although it is, of course, not new to recirculate fluid from one end of a cylinder to the other in the lowering phase of a load-handling system, the present arrangement provides many advantages, such as the circulation of the fluid through the valve, the provision of novel means within the valve itself to accommodate control of the recirculation and, of material significance, the use of the diversionary or relief valve means 148—150 to pressurize the recirculating circuit for purposes already outlined. Of still further importance is the diversion not directly to the reservoir but to the return line 62, which is at pump pressure because of the connection thereto of the pump passage 120. Hence, even the volumetric excess cannot surge directly into the reservoir but must follow the path indicated.

Since the diversion or auxiliary relief valve 150 is closed at pressures below the predetermined value, there is no possibility that the piston 52, in moving to the right, can pull a vacuum on the pump through the connected passages 120—114. When the load is floated, the recirculating circuit is isolated from the pump and if it is desired to operate valve A, full pump pressure is available.

Figure 5:
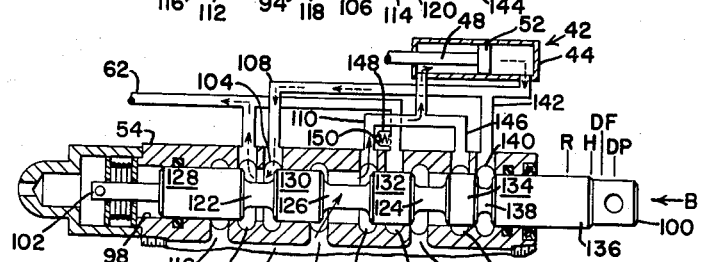
Fig. 5 is a similar view with the valve in its down-pressure position.

In the down-pressure position of control valve B as designated by the letters DP and shown in Fig. 5, fluid under pressure is supplied from the pump to the small-volume end of the cylinder 44, pump pressure flowing through the pump passage 118, across the valve bore 98 via the reduced portion 126 of the valve member 100, and through the second motor passage 106 and second motor line 110 to the small-volume end of the cylinder. The motor branch passages 116 and 120 are blocked, as are the recirculating passages 140 and 144 and the second return passage 114. Hence, fluid exhausted from the large-volume end of the cylinder follows the line 108 and is transferred from the first motor passage 104 to the first return passage 112 via the reduced portion 122 of the valve member 100, flowing thence to the return line 62. During this phase of operation, the auxiliary relief valve 150 is exposed to pump pressure in the line 110 and, since this valve is set at a lower value than the main relief valve 96, it will open first in the event of an abnormal rise in pressure, but because the passage thus opened is so small it cannot accommodate full pump flow and the main relief valve still determines the relief pressure.

Although the drawings (Figs. 3–6) show parts in section and other parts schematically, it will be understood that most of the lines or passages, with the exception of extended lines connected to the motors, are formed interiorly of the casing 54 and that therefore the organization is one of compactness and simplicity. Various other features of the invention not categorically enumerated will undoubtedly occur to those versed in the art, as will many modifications and alterations in the preferred embodiment of the invention illustrated, all of which may be achieved without departure from the spirit and scope of the invention.

What is claimed is:

1. A control valve of the character described for use with a double-acting fluid motor providing a fluid-receivable chamber having oppositely disposed fluid-receivable sections, one of said sections having a larger volumetric capacity than the other section, comprising: a valve casing having a valve bore and a valve member axially shiftably carried therein, said casing having a plurality of passages therein opening to the bore, including: a plurality of axially spaced fluid supply passages; a first pair of axially offset passages comprising a first motor passage, for connection to the large-volume section of the chamber, and a first return passage; a second pair of passages axially offset and spaced axially beyond the first pair and including a second motor passage, for connection to the small-volume section of the chamber, and a second return passage; a third pair of axially offset passages spaced axially beyond the second pair and including first and second recirculating passages connected respectively to the large volume section and small volume section of the chamber; said valve member having thereon a plurality of axially spaced passage-controlling portions and being selectively shiftable axially to any one of four positions, including: a neutral position in which at least one of the supply passages is connected to both return passages, the motor passages are blocked from their respective return passages and the recirculating passages are blocked from each other; separate raise and down-pressure positions in which one of the supply passages is connected exclusively to a selected motor passage, the associated return passage is blocked and the other motor passage is connected to its respective return passage, and the recirculating passages are blocked from each other; and a drop-float position in which the motor and return passages are blocked from each other, one of the supply passages is connected exclusively to the second return passage and the recirculating passages are connected to each other so that fluid exhausted from the large-volume section of the chamber flows directly to the small-volume section thereof via a portion of the first motor passage, the first recirculating passage, a portion of the valve bore, the second recirculating passage and a portion of the second motor passage; and relief valve means cross-connecting the second motor and second return passages and normally closed to prevent fluid flow from said second motor passage to said second return passage at pressures below a predetermined value, thereby insuring filling of the small-volume section of the chamber with a portion of the fluid exhausted from the large-volume section of the chamber, said relief valve means being operative to open in response to pressure in excess of said value to divert volumetric excess of fluid exclusively to said one of the return passages.

2. The invention defined in claim 1, in which: the arrangement of positions is such that the drop-float position is immediately adjacent to the neutral position.

3. A control valve of the character described for use with a double-acting fluid motor providing a fluid-receivable chamber having oppositely disposed fluid receivable sections, one of said sections having a larger volumetric capacity than the other section, comprising: a valve casing having a valve bore and a valve member axially shiftably carried therein, said casing having a plurality of passages therein opening to the bore, including: a plurality of fluid supply passages; a first pair of axially offset passages comprising a first motor passage, for connection to the large-volume section of the chamber, and a first return passage; a second pair of passages axially offset and spaced axially beyond the first pair and including a second motor passage, for connection to the small-volume section of the chamber, and a second return passage; a third pair of axially offset passages spaced axially beyond the second pair and including first and second recirculating passages connected respectively to the large volume section and small volume section of the chamber; said valve member having thereon a plurality of axially spaced passage-controlling portions and being selectively shiftable axially to any one of four positions, including: a neutral position in which at least one of the supply passages is connected to both return passages, the motor passages are blocked from their respective return passages and the recirculating passages are blocked from each other; separate raise and down-pressure positions in which at least one of the supply passages is connected exclusively to a selected motor passage, the associated return passage is blocked and the other motor passage is connected to its respective return passage, and the recirculating passages are blocked from each other; and a drop-float position in which the motor and return passages are blocked from each other, at least one of the supply passages is connected to at least one of the return passages, and the recirculating passages are connected to each other so that fluid exhausted from the large-volume section of the chamber flows directly to the small-volume section thereof; and relief valve means cross-connecting one of the recirculating passages and said one of the return passages and normally closed to prevent fluid flow from said one recirculating passage to said one of the return passages at pressures below a predetermined value, thereby insuring filling of the small-volume section of the chamber with a portion of the fluid exhausted from the large-volume section of the chamber, said relief valve means being operative to open in response to pressure in excess of said value to divert volumetric excess of fluid exclusively to said one of the return passages.

4. The invention defined in claim 3, in which: the relief valve means is connected to said second recirculating passage downstream of the control valve so that the relief valve means is isolated from supply pressure when the control valve is in its raise position.

References Cited in the file of this patent

UNITED STATES PATENTS

| | | |
|---|---|---|
| 2,543,989 | Rockwell | Mar. 6, 1951 |
| 2,621,478 | Bridwell et al. | Dec. 16, 1952 |
| 2,654,998 | Naylor et al. | Oct. 13, 1953 |